Figures 1, 2:
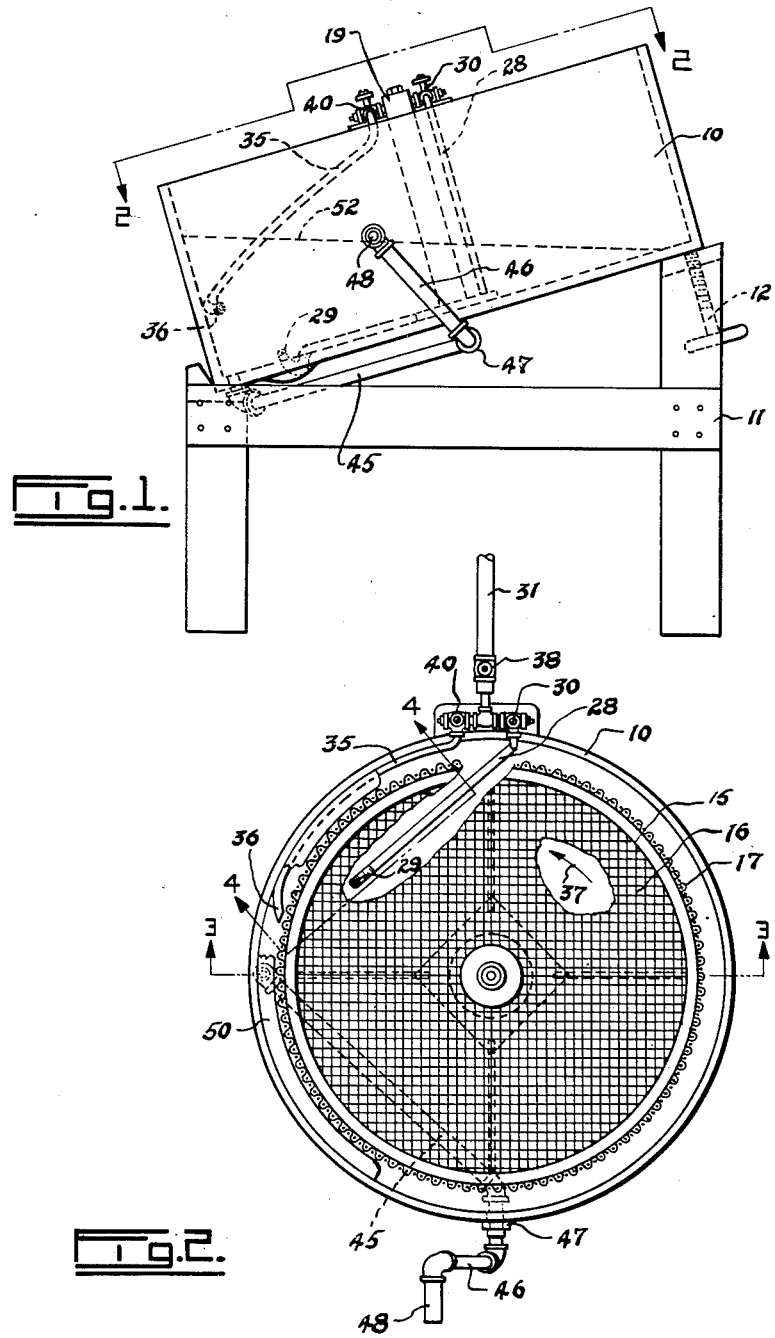

June 9, 1953   C. W. HUTCHINS   2,641,170
PRINT WASHING MACHINE
Filed Feb. 27, 1950   2 Sheets-Sheet 1

INVENTOR
CECIL W. HUTCHINS
BY
Fetherstonhaugh & Co
ATTORNEYS

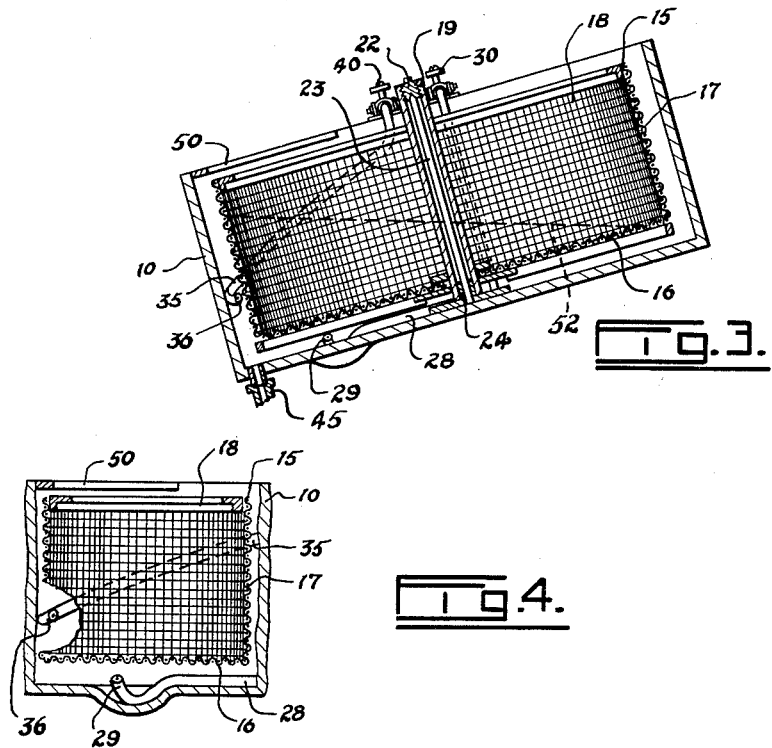

Patented June 9, 1953

2,641,170

UNITED STATES PATENT OFFICE 2,641,170

PRINT WASHING MACHINE

Cecil W. Hutchins, Vancouver, British Columbia, Canada

Application February 27, 1950, Serial No. 146,464

3 Claims. (Cl. 95—93)

This invention relates to improvements in machines for washing photographic prints.

An object of the present invention is the provision of a print washing machine in which the prints are alternately and continuously immersed in a body of water and drained during operation of the machine.

Another object is the provision of a print washing machine including a wire basket for holding the prints rotating in a body of water together with hydraulic means for flushing the prints away from the surface of the basket and additional hydraulic means for separating the prints suspended in the water from each other.

Another object is the provision of a machine for washing photographic prints in which the chemicals are more thoroughly removed in less time than any machine for this purpose now on the market.

A further object is the provision of a print washing machine, the interior of which is readily accessible whether it is in operation or not, which is self-cleaning, which may be very easily adjusted for different types of work, and which is very inexpensive to manufacture.

This machine consists of a tank having a wire mesh basket rotatably mounted therein. This basket is positioned at an angle to the horizontal and for the sake of convenience the tank may be positioned at the same angle, although the basket may actually be at an angle to the tank. This basket is preferably open-topped so that access may be gained to the interior thereof regardless of whether it is rotating or not. The tank is adapted to hold water and suitable means is provided for keeping the water at such a level that a part of the bottom of the basket always extends above it. The basket may be rotated by any suitable means, but it is preferable to use hydraulic means since the latter may be used to help separate the prints from each other. A stream of water is directed against a portion of the bottom of the basket immersed in the water at an angle thereto so that the basket is caused to rotate and, at the same time, any prints lying on said bottom are flushed away therefrom. Another system of water is directed into the basket amongst the suspended prints to separate them from each other.

An example of this invention is illustrated in the accompanying drawings, in which, Figure 1 is a side elevation of the apparatus, Figure 2 is a view taken on the line 2—2 of Figure 1, Figure 3 is a cross section of the apparatus taken on the line 3—3 of Figure 2, and, Figure 4 is a fragmentary cross section taken substantially on the line 4—4 of Figure 2.

Referring to the drawings, 10 is a tank mounted on a suitable framework 11. This tank is preferably, although not absolutely necessarily, positioned at an angle to the horizontal. When it is set at an angle, an adjusting screw 12 may be provided near an edge of the bottom thereof by means of which the angle may be varied.

A wire mesh basket 15 having a bottom 16 and a side wall 17 is rotatably mounted in the tank. The basket is preferably open at its top, as at 18, and it may be mounted by means of a tube 19 which extends upwardly from the centre thereof. This tube has a pivot bearing 22 at its upper end which rests on a pointed spindle 23, which extends upwardly from the bottom of the tank to which it is secured. The tube 19 projects below the bottom of the basket and slidably fits over a bearing block 24 which is also secured to the bottom of the tank. As the spindle is located at an angle to the vertical, the basket is free to rotate therearound in a plane at right angles to the spindle and at an angle to the horizontal.

The basket may be rotated in any convenient manner, but it is preferable to rotate it hydraulically. For this purpose, a pipe 28 extends down into the tank 10 and has a nozzle 29 with a very small discharge orifice, which extends upwardly towards the bottom 16 of the basket adjacent the lowermost edge thereof and at an angle thereto. This pipe extends from a control valve 30 to which a pipe 31 is connected, the latter pipe extending from a suitable source of water supply, not shown. Another pipe 35 extends into the tank and has a nozzle 36 with a very small discharge orifice, which is directed towards the side 17 of the basket adjacent its lowermost point and behind the nozzle 29, having regard to the direction of rotation of the basket, which is indicated by the arrow 37 in Figure 2. The nozzle 36 is directed towards the side of the basket at an angle thereto. The pipe 35 extends to a control valve 40 which is also connected to the supply pipe 31. It is desirable to have a master valve 38 in the supply pipe.

The tank 10 is adapted to hold a quantity of water and suitable means is provided for maintaining the level of this water at any desired point, depending upon the work being done. One way of accomplishing this is to provide a drain pipe 45 extending out of the tank at the lowermost point thereof. This pipe extends to one side of the tank and a stand-pipe 46 is rotatably connected thereto by a suitable union 47.

The pipe 46 extends generally in an upward direction and has a discharge end 48, the position of which determines the level of the water in the tank. If desired, a flange 50 may extend around the top of the tank at the lowermost side thereof in order to keep water from slopping out of it.

In operation, prints to be washed are placed in the basket and the master valve 38 is opened, so that water is directed by the nozzles 29 and 36 through the bottom and side of the basket. This causes the body of water in the tank and the basket to rotate. At the same time, the water from the nozzle 29 flushes the prints away from the basket bottom, while the water from the nozzle 36 is directed against the prints suspended in the water. The central valves are set so as to provide sufficient water to accomplish the proper washing of the prints. The water in the tank and basket is maintained at a level such as that indicated by the numeral 52 in Figures 1 and 3 by the standpipe 46. This pipe may be turned on its union to move its discharge end 48 to maintain the water level at any desired point. It will be noted in Figure 3 that a portion of the bottom of the basket projects above the water level. This is helpful if it is desired alternately to immerse the prints in and to remove them from the water during rotation of the basket. This allows the water to drain from the prints so that they are more thoroughly and quickly washed than would otherwise be the case.

Two jets of water directed through the basket cause the latter and the body of water in the tank to rotate, and they wash the prints as well as swirl them around in the body of water to cause them to separate from each other and to get a thorough rinsing. The speed of rotation of the basket may be adjusted by means of one or both of the valves 30 and 40. The central mounting of the basket is very simple and efficient, and it does not interfere with the rinsing and washing operation of the machine. Furthermore, this mounting permits the basket to be removed from the tank with its contents if this is so desired. The fact that the top of the basket is open makes it possible to add prints to and remove them from the basket even while the machine is in operation.

The term "wire basket" as used in this specification and in the accompanying claims is intended to cover any basket made of screening or any other material which is perforated enough to allow the free passage of water or other liquid therethrough.

What I claim as my invention is:

1. In a print washing machine, an open top receptacle having imperforate bottom and side walls, said receptacle being adapted to contain washing liquid at a predetermined level therein, an open top print holding basket having a substantially planar perforated bottom and a perforated side wall, means supporting said basket in the receptacle for rotative movement about an axis inclined between the vertical and horizontal, the bottom of the basket lying in a plane perpendicular to said axis and at an acute angle to the horizontal, so that the upper inclined portion of the bottom will be above and a lower portion below the level of the liquid in the receptacle to thereby alternatively immerse and remove prints from the liquid during rotation of the basket, and means for directing a jet of liquid against said planar bottom to rotate the basket and to agitate the prints therein.

2. The structure set forth in claim 1, and means on the receptacle for varying the level of liquid in said receptacle so that said perforated bottom will have a greater or lesser portion disposed above the level of said liquid.

3. A print washing machine comprising an inclined tank adapted to hold water, a spindle projecting upwardly from the bottom of the tank at an angle to the horizontal, a wire-mesh basket mounted in the tank, a tube secured to the bottom of the basket and projecting upwardly therein, said tube fitting over the spindle, a pivot bearing in the outer end of the tube seated on the spindle, another bearing on the bottom of the tank slidably fitting in the lower end of the tube, and means for directing a jet of water against and through the basket at an angle thereto to cause rotation thereof.

CECIL W. HUTCHINS.

References Cited in the file of this patent

UNITED STATES PATENTS

| Number | Name | Date |
|---|---|---|
| 187,163 | Miller | Feb. 6, 1877 |
| 633,922 | Studdiford | Sept. 26, 1899 |
| 983,141 | Hutteballe et al. | Jan. 31, 1911 |
| 1,276,289 | Ulrich | Aug. 20, 1918 |
| 2,321,435 | Swartz | June 8, 1943 |